(12) United States Patent
Nakagoshi

(10) Patent No.: US 8,045,877 B2
(45) Date of Patent: Oct. 25, 2011

(54) HISTORY INFORMATION MANAGEMENT DEVICE OF IMAGE FORMING APPARATUS

(75) Inventor: Yusuke Nakagoshi, Osaka (JP)

(73) Assignee: Kyocera Mita Corporation (JP)

( * ) Notice: Subject to any disclaimer, the term of this patent is extended or adjusted under 35 U.S.C. 154(b) by 593 days.

(21) Appl. No.: 12/256,199

(22) Filed: Oct. 22, 2008

(65) Prior Publication Data

US 2009/0112791 A1    Apr. 30, 2009

(30) Foreign Application Priority Data

Oct. 31, 2007  (JP) ................................ 2007-283198

(51) Int. Cl.
*G03G 15/00* (2006.01)
(52) U.S. Cl. .......................................... 399/81; 399/10
(58) Field of Classification Search .................... 399/81, 399/10, 75
See application file for complete search history.

(56) References Cited

U.S. PATENT DOCUMENTS

2008/0317478 A1* 12/2008 Suda ................................ 399/10

FOREIGN PATENT DOCUMENTS

| JP | 2004-206179 A | 7/2004 |
| JP | 2005-153346 A | 6/2005 |
| JP | 2006-094066 A | 4/2006 |

* cited by examiner

*Primary Examiner* — Susan Lee
(74) *Attorney, Agent, or Firm* — Ostrolenk Faber LLP

(57) ABSTRACT

A history information management device 100 includes an operation panel 5 having a touch panel 5a, first storage unit 44a, storage operation control unit 45d, and display operation control unit 45e. The operation panel 5 receives a functional configuration. The first storage unit 44a stores the functional configuration as the history information, and the touch panel 5a displays it. The storage operation control unit 45d controls a storing operation for history information in the first storage unit 44a based on a first condition judging whether or not the storage operation control unit 45d controls the first storage unit 44a to store the history information. The display operation control unit 45e controls a displaying operation of the history information on the touch panel 5a based on a second condition judging whether or not the display operation control unit 45e controls the touch panel 5a to display the history information.

6 Claims, 13 Drawing Sheets

HISTORY INFORMATION LIST

| CONFIGURATION DATE AND TIME | HISTORY INFORMATION |
|---|---|
| 2007/10/01 11:55 | SORT, PLURAL-SIZED MANUSCRIPTS LOADING, MANUSCRIPT DIRECTION |
| 2007/10/01 14:23 | MANUSCRIPT SIZE CONFIGURATION, DUPLEX PRINTING, LENGTHY MANUSCRIPT |
| 2007/10/02 09:01 | TRANSMISSION SIZE CONFIGURATION, DESTINATION abc, SOURCE def |
| 2007/10/02 09:02 | DESTINATION pqr, TRANSMISSION TIME |
| 2007/10/02 18:54 | SORT, MANUSCRIPT SIZE CONFIGURATION, DUPLEX PRINTING, MANUSCRIPT DIRECTION |
| ⋮ | ⋮ |

Fig. 3

STORAGE CONDITION TABLE

| USER # | STORAGE PERMISSION RANGE | STORAGE PROHIBITION RANGE |
|---|---|---|
| 001 | ALL COPY FUNCTIONS, SOURCE NAME | DESTINATION NAME, TRANSMISSION ADDRESS, ... |
| 002 | ALL COPY FUNCTIONS, TRANSMISSION ADDRESS | TRANSMISSION SIZE CONFIGURATION, SOURCE NAME, ... |
| 003 | ALL TRANSMISSION FUNCTIONS | ALL COPY FUNCTIONS |
| 004 | SORT, MANUSCRIPT SIZE CONFIGURATION | ALL TRANSMISSION FUNCTIONS, DUPLEX PRINTING, MANUSCRIPT DIRECTION, ... |
| 005 | DUPLEX PRINTING, MANUSCRIPT DIRECTION | ALL TRANSMISSION FUNCTIONS, SORT, MANUSCRIPT SIZE CONFIGURATION, ... |
| ⋮ | ⋮ | ⋮ |
| GENERAL USER | ALL COPY FUNCTIONS | ALL TRANSMISSION FUNCTIONS |
| ⋮ | ⋮ | |

Fig. 4

DISPLAY CONDITION TABLE

| USER # | DISPLAY PERMISSION RANGE | DISPLAY PROHIBITION RANGE |
|---|---|---|
| 001 | ALL COPY FUNCTIONS | SOURCE NAME, DESTINATION NAME, TRANSMISSION ADDRESS |
| 002 | ALL COPY FUNCTIONS | TRANSMISSION SIZE CONFIGURATION, SOURCE NAME, TRANSMISSION ADDRESS |
| 003 | ALL TRANSMISSION FUNCTIONS EXCLUDING SOURCE NAME | ALL COPY FUNCTIONS, SOURCE NAME |
| 004 | SORT, MANUSCRIPT SIZE CONFIGURATION | ALL TRANSMISSION FUNCTIONS, DUPLEX PRINTING, MANUSCRIPT DIRECTION,··· |
| 005 | DUPLEX PRINTING, MANUSCRIPT DIRECTION | ALL TRANSMISSION FUNCTIONS, SORT, MANUSCRIPT SIZE CONFIGURATION,··· |
| ⋮ | ⋮ | ⋮ |
| GENERAL USER | ALL COPY FUNCTIONS | ALL TRANSMISSION FUNCTIONS |
| ⋮ | ⋮ | |

Fig. 5

HISTORY INFORMATION MANAGEMENT DEVICE OF IMAGE FORMING APPARATUS

CROSS-REFERENCE TO RELATED APPLICATIONS

This application claims priority to Japanese Patent Application No. 2007-283198 filed on Oct. 31, 2007. The entire disclosure of Japanese Patent Application No. 2007-283198 is hereby incorporated herein by reference.

BACKGROUND OF THE INVENTION

1. Field of the Invention

The present invention relates to a history information management device, more specifically, a history information management device of an image forming apparatus having a plurality of functions.

2. Background Information

The recent image forming apparatus has a plurality of functions such as a duplex printing function, a sort function, and a transmission-size configuration function used when image data are transmitted. The functions enable a user to perform a variety of tasks such as photocopying of a manuscript in a desired condition and image data transmission.

However, if many functions are used in performing photocopy or data transmission, it takes a long time to complete configurations of the functions. In addition, some of the functions may be repeatedly used in accordance with their configurations. Some technical arts have been produced for coping with the above-mentioned problems. For example, according to an image forming apparatus disclosed in Japanese Patent Application Publication No. JP-A-2004-206179, the past configuration is configured to be stored as the history information. When a user operates the image forming apparatus, the history information is configured to be read out and displayed. Also, according to an image forming apparatus disclosed in Japanese Patent Application Publication No. JP-A-2005-153346, the history information is not simply stored, but is stored on a user-to-user basis from the standpoint of information security. Moreover, according to an image forming apparatus disclosed in Japanese Patent Application Publication No. JP-A-2006-94066, the history information is configured to be displayed after user authentication.

According to the publication No. JP-A-2004-206179, the unlimited number of history information will be stored in a storage unit. Accordingly, a plurality of information will be displayed in displaying the history information, which adversely affects the user-friendliness of the image forming apparatus.

Also, according to the publication No. JP-A-2005-153346, a storage condition of the history information is allowed to be switched between a storage permission condition and a storage prohibition condition on a user-to-user basis. However, when the storage condition of the history information is set to be the storage prohibition condition, all of the history information is prevented from being stored. Thus, even if given history information does not have any security problems, the information is not allowed to be stored.

Furthermore, according to the publication No. JP-A-2006-94066, the history information is configured to be displayed after the user authentication. With this configuration, it is possible to ensure information security. However, even if given history information is not necessary for a user, the history information will be displayed as long as the user authentication is competed.

Accordingly, aspects of the present invention have been created to solve the above-mentioned problems occurring in the conventional practice and to provide a history information management device of an image forming apparatus for appropriately performing an operation of storing the history information and an operation of displaying the history information.

These and other objects, features, aspects, and advantages of the present invention will become apparent to those skilled in the art from the following detailed description, which, taken in conjunction with the annexed drawings, discloses a preferred embodiment of the present invention.

SUMMARY OF THE INVENTION

A first aspect of the present invention relates to a history information management device of an image forming apparatus having a plurality of functions. The history information management device includes a configuration receiving unit, a storage unit, a display unit, and an operation control unit. The configuration receiving unit is configured to receive a configuration for at least one of the plurality of functions. The storage unit is configured to store the configuration received by the configuration receiving unit as history information. The display unit is configured to display the history information. The operation control unit is configured to control an operation of storing the history information performed by the storage unit based on a first condition for judging whether or not the operation control unit controls the storage unit to store the history information and/or an operation of displaying the history information performed by the display unit based on a second condition for judging whether or not the operation control unit controls the display unit to display the history information.

According to the history information management device, the history information will be stored in the storage unit when judged to be stored based on the first condition. Also, the history information will be displayed on the display unit when judged to be displayed based on the second condition. Accordingly, unnecessarily excessive history information is not displayed on the display unit. Thus, the user-friendliness of the device will be enhanced. Also, depending on a configuration of the first and second conditions, the storage unit and the display unit do not have to store and display the personal information (e.g., destination of data transmission) as the history information, respectively. Accordingly, the history information is not displayed on the display unit. Thus, information security will be enhanced.

A second aspect of the present invention relates to the history information management device of an image forming apparatus in accordance with the first aspect, and further includes a first information obtaining unit. The first information obtaining unit is configured to obtain first information regarding the function to be limited to be stored in the storage unit and/or displayed on the display unit. In addition, the first and second conditions are determined based on the first information.

The first information relates to information regarding a function to be limited to be stored and/or displayed. More specifically, the first information corresponds to a single or plurality of configuration items of the function on which a user wants to impose a limitation in the storage and display. According to the history information management device, the first information obtaining unit directly obtains a single or plurality of configuration items (i.e., the first information) on which a user wants to impose a limitation in the storage and/or display, for instance. Also, the first and second conditions are determined based on the configuration item(s). Thus, a user is capable of directly imposing limitations in the storage and/or display on the configuration item(s). Therefore, usability of the device will be enhanced.

A third aspect of the present invention relates to the history information management device of an image forming apparatus in accordance with the second aspect, and further includes a second information obtaining unit. The second information obtaining unit is configured to obtain second information for limiting a range of the first information to be obtained by the first information obtaining unit. In addition, the first and second conditions are further determined based on the second information.

The second information relates to information for limiting a range of a single or plurality of configuration items allowed to be configured by a user through the first information obtaining unit. In other words, the second information corresponds to "a user-specific limitation range for a single or plurality of configuration items." According to the history information management device, the second information obtaining unit is configured to obtain the user-specific limitation range for a single or plurality of configuration items. Also, the first and second conditions are determined based on the limitation range for a single or plurality of configuration items. Therefore, a user is allowed to impose limitations in the storage and/or display on a single or plurality of configuration items included in the limitation range.

A fourth aspect of the present invention relates to the history information management device of an image forming apparatus in accordance with the third aspect, wherein the first and second information obtaining units are configured to obtain a plurality of the first information and a plurality of the second information by a single operation performed by a user, respectively.

According to the history information management device, the first and second information obtaining units are capable of obtaining a plurality of configuration items (i.e., the first information) on which a user wants to impose limitations in the storage and/or display and a plurality of the user-specific limitation ranges for a single or plurality of configuration items (i.e., the second information) in a single operation performed by a user. Therefore, if a user wants to impose limitations in the storage and/or display on all configuration items of a function, for instance, the user is capable of imposing the limitation on all configuration items by a single operation without selecting and then imposing the limitation on all configuration items one by one. Accordingly, usability of the device will be further enhanced.

A fifth aspect of the present invention relates to the history information management device of an image forming apparatus in accordance with the first aspect, and further includes an erasing unit. The erasing unit is configured to erase the history information from the storage unit when the history information is judged not to be displayed on the display unit.

Accordingly, the amount of the history information to be stored in the storage unit will be reduced. In addition, a malevolent person will be prevented from reading out and referring to the history information stored in the storage unit. In other words, so-called hacking activities will be blocked. Accordingly, information security of the history information management device will be enhanced.

A sixth aspect of the present invention relates to the history information management device of an image forming apparatus in accordance with the first aspect wherein the first and second conditions are uniquely configured on a user-to-user basis, respectively.

According to the history information management device, the history information is configured to be stored in the storage unit and displayed on the display unit in a condition uniquely configured on a user-to-user basis.

According to the present invention, operations of storing and displaying the history information are appropriately performed. Therefore, unnecessarily excessive history information is not displayed on the display unit. Thus, user-friendliness of the device will be enhanced. Furthermore, depending on a configuration of the first and second condition, the storage unit and the display unit do not have to store and to display the personal information (e.g., destination of data transmission) as the history information, respectively. Accordingly, this type of history information is not displayed on the display unit. In other words, information security will be enhanced.

BRIEF DESCRIPTION OF THE DRAWINGS

Referring now to the attached drawings which form a part of this original disclosure:

FIG. 3 is a view of a conceptual diagram of a history information list stored in a first storage unit of the history information management device;

FIG. 4 is a view of a conceptual diagram of a storage condition table stored in a second storage unit of the history information management device;

FIG. 5 is a view of a conceptual diagram of a display condition table stored in the second storage unit;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A history information management device of an image forming apparatus in accordance with an embodiment will be hereinafter explained in detail with reference to the attached figures.

1. Configuration of Image Forming Apparatus

Figure 1:
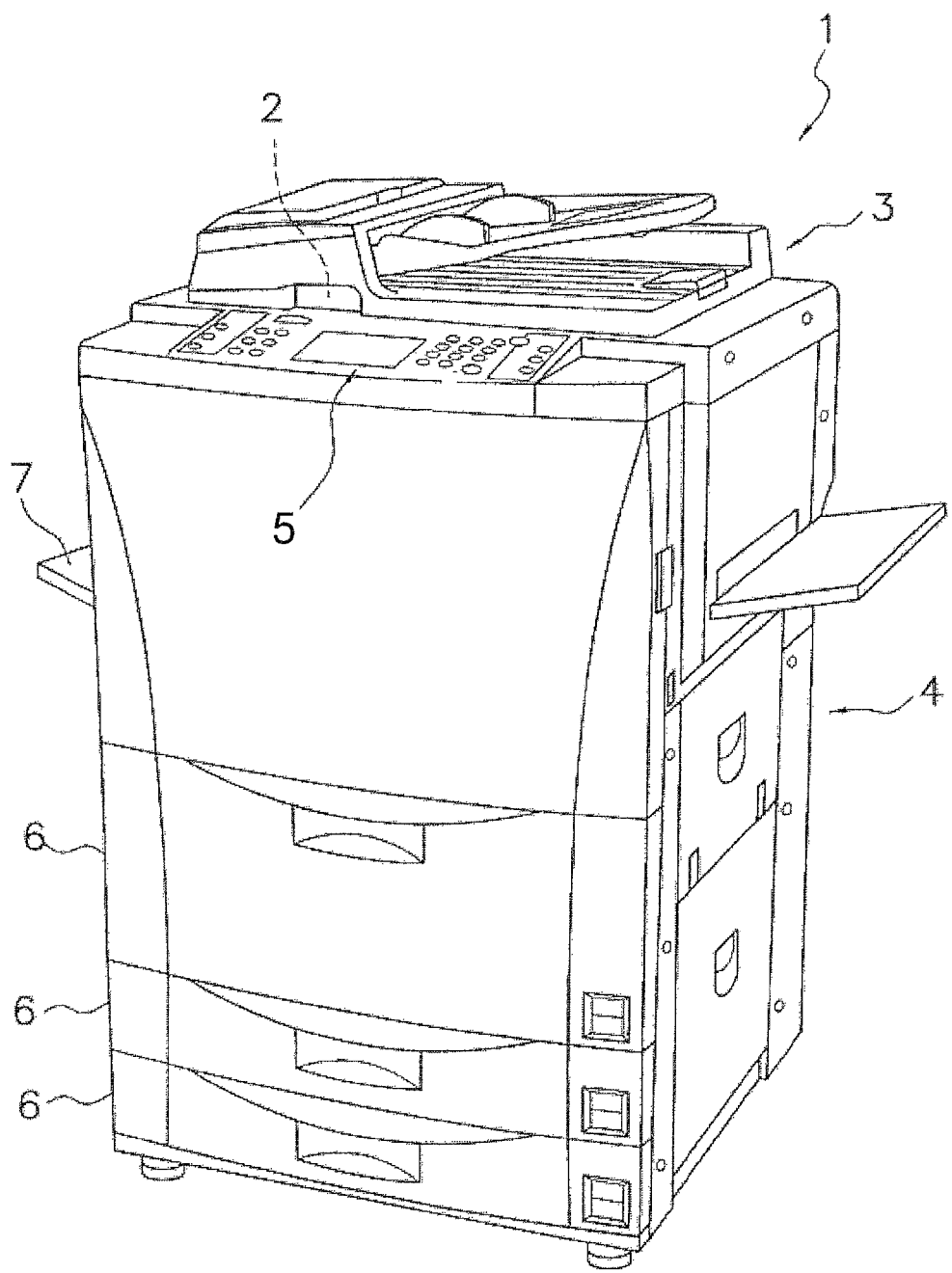
FIG. 1 is a view of a schematic diagram of an image forming apparatus adopting a history information management device in accordance with a preferred embodiment of the present invention.

FIG. 1 is an external view of an image forming apparatus 1. Here, a history information management device 100 of the present embodiment is applied to the image forming apparatus 1. In the present embodiment, a multifunction peripheral (MFP) is exemplified as the image forming apparatus 1. Note that the MFP has a plurality of functions of a photocopier, a printer, a facsimile, and a scanner. As illustrated in FIG. 1, the image forming apparatus 1 includes a platen cover 3, a main body 4, an operation panel 5, paper feeding cassettes 6, and a discharge tray 7. Also, the image forming apparatus 1 has a plurality of functions such as: a photocopy function; a transmission function for transmitting the image data and the like; and a box function for classifying the image data and storing it into a desired folder. Furthermore, each function has a single or plurality of detailed functions. For example, the photocopy function has a sort function and a duplex printing function. The transmission function has a destination registration function and a source registration function. The box function has a plural-sized-manuscripts loading function and a resolution change function.

A platen 2 is provided in the main body 4, and is opposed to the platen cover 3. The platen cover 3 is attached to the main body 4. The platen cover 3 is configured to be positioned in closed and opened states. The platen cover 3 makes contact with the platen 2 in the closed state while it does not make contact with the platen 2 in the opened state. Also, the platen cover 3 is configured to press a manuscript disposed on the platen 2.

Figure 2:
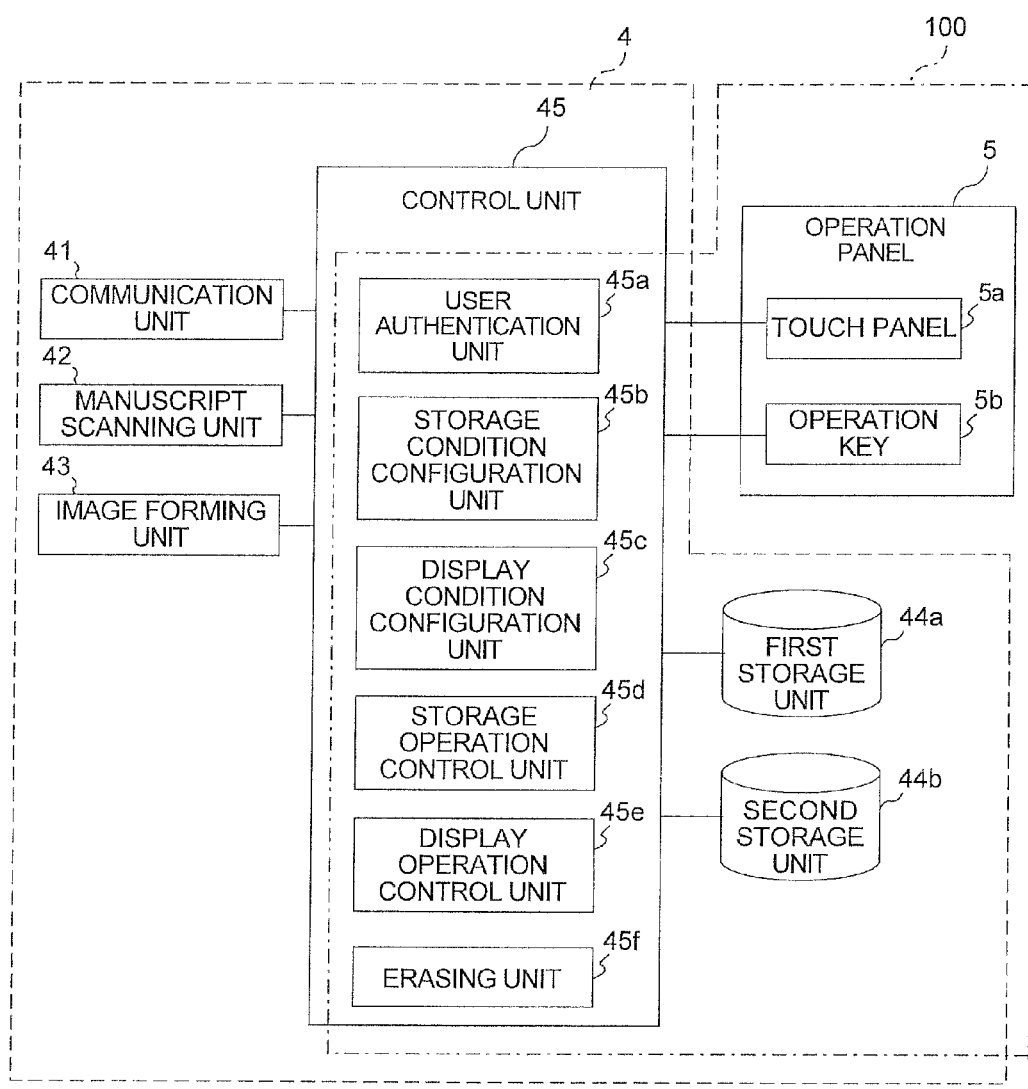
FIG. 2 is a view of a block diagram illustrating a schematic configuration of the image forming apparatus and the history information management device.

As illustrated in FIG. 2, the main body 4 mainly includes a communication unit 41, a manuscript scanning unit 42, an image forming unit 43, a first storage unit 44a (corresponding to a storage unit), a second storage unit 44b, and a control unit 45.

The communication unit 41 is configured to communicate with an external apparatus/device connected to the image forming apparatus 1 through a communication network. For example, the external apparatus/device is a personal computer (not illustrated in the figure). The communication unit 41 is configured to obtain data (e.g., image data) from the external apparatus/device.

The manuscript scanning unit 42 is configured to scan a manuscript disposed on the platen 2, and obtains the image data from the manuscript. The manuscript scanner 42 includes an optical system (not illustrated in the figure).

The image forming unit 43 forms an image onto a sheet of paper based on the image data obtained through the communication unit 41 and the manuscript scanning unit 42. In other words, the image forming unit 43 performs a printing operation with respect to the sheet of paper. Specifically, when a user performs configurations with respect to some of the functions of the image forming apparatus 1 through the operation panel 5, the image forming unit 43 performs an image forming operation in accordance with the configurations.

The first and second storage units 44a and 44b are respectively made up of a non-volatile memory (e.g., flash memory). A history information list (FIG. 3) is stored in the first storage unit 44a. The history information list includes the date and time when a user performs at least a functional configuration and the history information indicating a single or plurality of past functional configurations (specifically, a single or plurality of configured functions and the detailed content thereof). Here, the date and time and the history information are associated as a record. On the other hand, a storage condition table (FIG. 4) and a display condition table (FIG. 5) are stored in the second storage unit 44b. The storage condition table (FIG. 4) includes the user number given to a user operating the image forming apparatus 1, the storage permission range of the history information, and the storage prohibition range of the history information. Here, the user number, the storage permission range, and the storage prohibition range are associated as a record. In the present embodiment, the variety of information in the storage condition table is referred to as a storage condition (corresponding to a first condition). The storage condition is used for judging whether or not the after-mentioned control unit 45 of the history information management device 100 controls the first storage unit 44a to store the history information. On the other hand, the display condition table (FIG. 5) includes the user number, the display permission range of the history information, and the display prohibition range of the history information. Here, the user number, the display permission range, and the display prohibition range are associated as a record. In the present embodiment, the variety of information in the display condition table is referred to as a display condition (corresponds to a second condition). The display condition is used for judging whether or not the after-mentioned control unit 45 in the history information management device 100 controls a touch panel 5a in the operation panel 5 to display the history information. In the present embodiment, the storage condition table (FIG. 4) includes a single or plurality of records, and the storage condition is uniquely configured on the user-to-user basis. Also, the display condition table (FIG. 5) includes a single or plurality of records, and the display condition is uniquely configured on the user-to-user basis.

The control unit 45 is made up of a microcomputer including a CPU and memories (e.g., ROM and RAM). Here, a variety of programs are stored in the ROM, and the programs are configured to be read out and performed by the CPU. The RAM functions as a working memory to be used when the CPU executes a program. As illustrated in FIG. 2, the control unit 45 is connected to the communication unit 41, the manuscript scanning unit 42, the image forming unit 43, the first storage unit 44a, the second storage unit 44b, and the operation panel 5. The control unit 45 controls a variety of the functional units connected thereto. For example, the control unit 45 controls an image forming operation performed by the image forming unit 43. In the present embodiment, the control unit 45 especially functions as an after-mentioned control unit in the history information management device 100. This will be described in detail in the following section entitled "2. Configuration of History Information Management Device."

Figure 6:
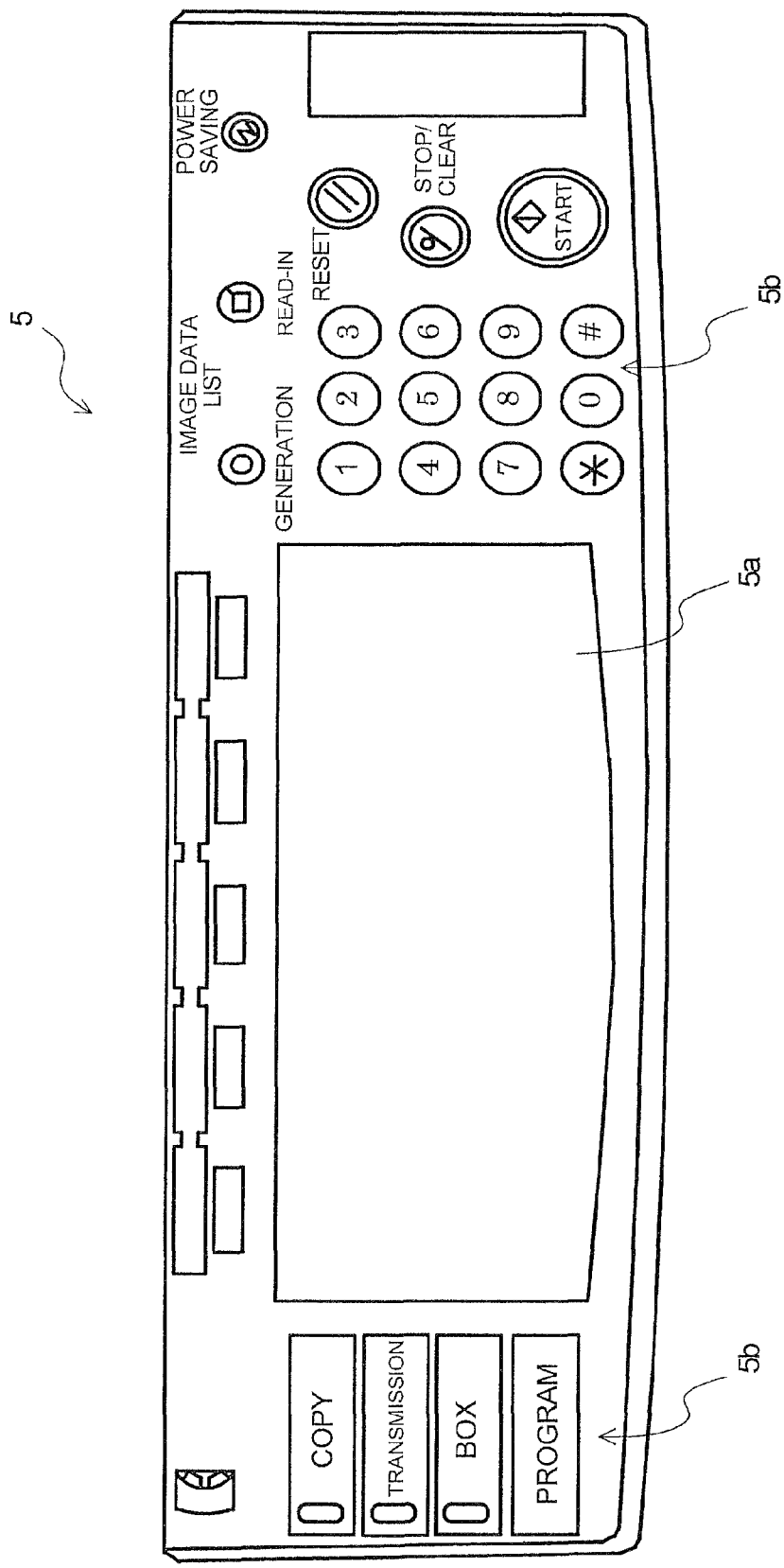
FIG. 6 is a view of a schematic diagram illustrating the appearance of an operation panel of the image forming apparatus.

As illustrated in FIG. 1, the operation panel 5 is preferably provided in the main body 4. The operation panel 5 is arranged in front of the platen 2. As illustrated in FIG. 6, the operation panel 5 includes the touch panel 5a and operation keys 5b. Here, the touch panel 5a corresponds to a display unit. Also, the touch panel 5a and the operation keys 5b correspond to a configuration receiving unit, a first information obtaining unit, and a second information obtaining unit. The touch panel 5a is preferably made up of a liquid crystal display (LCD) and a matrix switch, for instance. The touch panel 5a displays a variety of color screens. For example, the touch panel 5a displays a screen P1 (see FIG. 7), a condition configuration screen P2 (see FIG. 8), a condition configuration screen P3 (see FIG. 9), and a variety of configuration screens to be used for performing a configuration for each function of the image forming apparatus 1. The screen P1 shows the history information stored in the first storage unit 44a. The condition configuration screen P2 is used for configuring a storage condition included in the storage condition table (FIG. 4) stored in the second storage unit 44b. The condition configuration screen P3 is used for configuring a display condition included in the display condition table (FIG. 5) stored in the second storage unit 44b. The operation keys 5b include a start key, a reset key, numeric keys, and a variety of configuration keys. Here, the start key is used to instruct the start of a printing operation. The reset key is used for resetting a variety of configurations. The configuration keys are used for performing a variety of functional configurations. In the present embodiment, the configuration keys include a key for instructing a display of the history information and a key for configuring a storage condition and a display condition.

Figure 8:
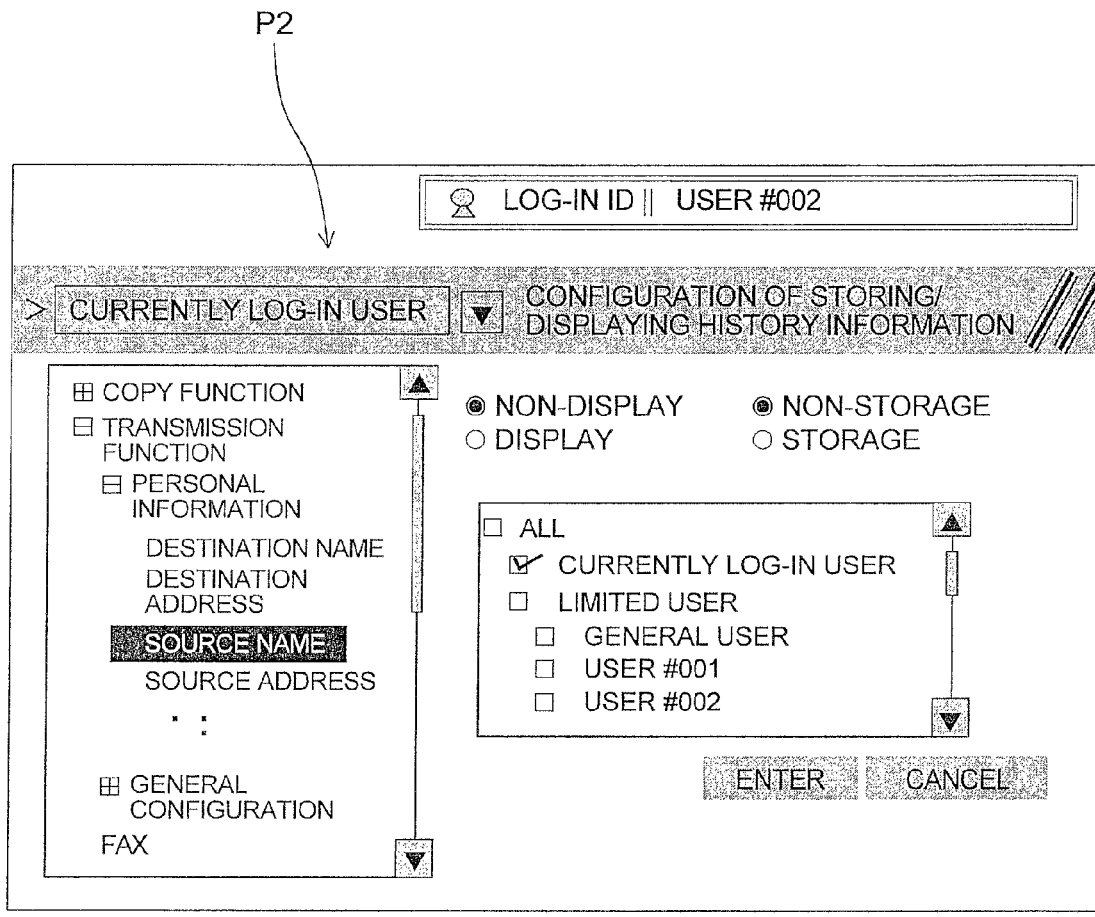
FIG. 8 is a view of an example of a condition configuration screen displayed on the touch panel configuring a storage condition and a display condition especially when a user operating the touch panel is identified as an authenticated user as a result of the user authentication.
Figure 9:
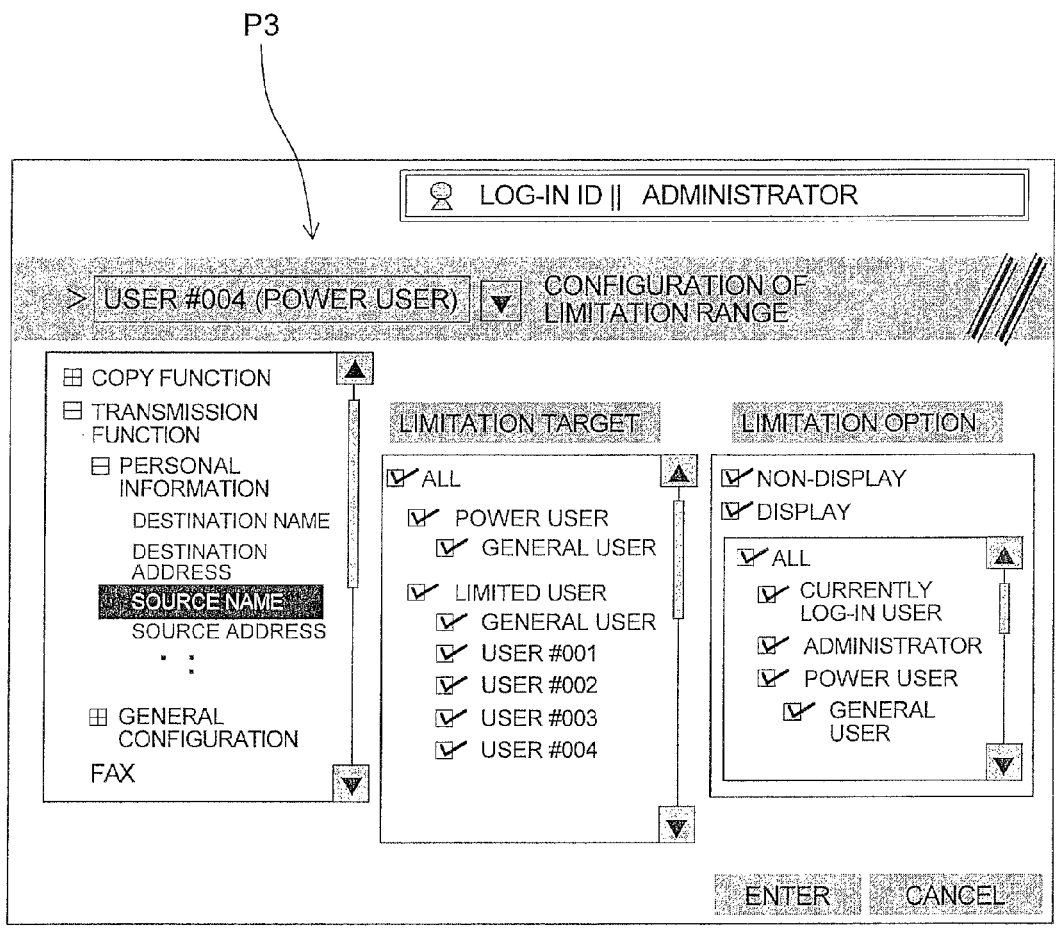
FIG. 9 is a view of an example of a condition configuration screen displayed on the touch panel configuring a storage condition and a display condition especially when a user operating the touch panel is identified as an administrator of the image forming apparatus as a result of the user authentication.

As described above, the operation panel 5 includes the touch panel 5a and the operation keys 5b, and is thus configured to receive a configuration for at least one of the functions of the image forming apparatus 1. Furthermore, the operation panel 5 is configured to receive first information through the screen P2 (FIG. 8) and the screen P3 (FIG. 9). Here, the first information relates to information of a function that storage of the history information in the first storage unit 44a and/or display of the history information on the touch panel 5a are/is limited. More specifically, the first information corresponds to a single or plurality of configuration items included in a function on which a user wants to impose a limitation for storage into the first storage unit 44a and/or limitation for display on the touch panel 5a. In an example of the screen P2 (FIG. 8), a user with the user number 002 (hereinafter simply referred to as "#002 user") currently logs in the image forming apparatus 1. The #002 user inputs information for preventing storage and display of the configuration item "source name" included in the transmission function (see a list box arranged in the left part of the screen P2). In this case, the configuration item "source name" to be neither stored nor displayed corresponds to the first information. Also, the operation panel 5 is configured to receive second information through the screen P2 (FIG. 8) and the screen P3 (FIG. 9). Here, the second information relates to the information for limiting the range of the first information. The second information relates to information for limiting a range of a single or plurality of configuration items allowed to be configured by a user through the operation panel 5. In other words, the second information corresponds to "a user-specific limitation range for a single or plurality of configuration items." In an example of the screen P3 (FIG. 9), an "administrator" currently logs in the image forming apparatus 1. The administrator inputs information for configuring all users to be "the limitation target" with respect to the configuration item "source name" included in the transmission function (see a check box "limitation target" arranged in the center part of the screen P3). In other words, such information that the configuration item "source name" is included in the range allowed to be configured by all users corresponds to the second information. Furthermore, in the screen P3 (FIG. 9), both of the options "display" and "non-display" are selected for all users (see a check box "limitation option" arranged in the right part of the screen P3). Accordingly, while the configuration item "source name" is configured as the first information, all users are allowed to input the information whether or not "source name" is stored and/or displayed. For example, if the configuration item "source name" is selected in the left-side list box and the option "display" is further selected for all users in the right-side check box "limitation option" in the screen P3 (FIG. 9), a check box option "display" will be accordingly selected with respect to the configuration item "source name" in the screen P2 (FIG. 8).

Also, items such as "all" and "limited user" are included in the screen P2 (FIG. 8) and the screen P3 (FIG. 9), respectively. If a user selects the item "all" or "limited user," this means that all sub-items included in the selected item "all" or "limited user" will be selected. For example, if the administrator selects the item "all" in the check box "limitation target" in the screen P3 (FIG. 9), this means that all sub-items included in the item "all" (e.g., "power user" and "limited user") will be accordingly selected. In the present embodiment, the operation panel 5 is thus configured to receive a plurality of the first information and the second information in a single operation performed by an authenticated user or an administrator.

The paper feeding cassettes 6 are configured to accommodate a single or plurality of sheets of paper, respectively. As illustrated in FIG. 1, three paper feeding cassettes 6 are arranged in the lower part of the main body 4.

The discharge tray 7 is arranged on the lateral surface of the main body 4, and laterally protrudes from the lateral surface. When an image is printed on a single or plurality of sheets of paper, the sheet of paper(s) is/are discharged to and disposed on the discharge tray 7.

2. Configuration of History Information Management Device

Next, a configuration of the history information management device 100 of the present embodiment will be hereinafter explained in detail. As illustrated in FIG. 2, the history information management device 100 includes the operation panel 5, the first storage unit 44a, the second storage unit 44b, and the control unit 45. The operation panel 5, the first storage unit 44a and the second storage unit 44b have been already explained above. Therefore, only the control unit 45 will be specifically explained. Note that the control unit 45 functions as a control unit of the history information management device 100.

When functioning as the control unit of the history information management device 100, the control unit 45 mainly controls a configuration of a storage condition and a display condition, a storage operation performed by the first storage unit 44a, and a display operation performed by the touch panel 5a in the operation panel 5. More specifically, when performing the above-mentioned controls, the control unit 45 also functions as a user authentication unit 45a, a storage condition configuration unit 45b, a display condition configuration unit 45c, a storage operation control unit 45d, a display operation control unit 45e, and an erasing unit 45f. Here, the storage operation control unit 45d and the display operation control unit 45e correspond to an operation control unit.

2-1. User Authentication Unit

Referring to FIG. 2, the user authentication unit 45a authenticates a user operating the operation panel 5. In the present embodiment, a result of the user authentication is mainly used for updating operations for the storage condition table (FIG. 4) and the display condition table (FIG. 5), a storage operation for storing the history information into the first storage unit 44a, and a display operation for displaying the history operation on the touch panel 5a.

In the present embodiment, the user authenticating unit 45a identifies an administrator and a single or plurality of users given a permission of using the image forming apparatus 1 (i.e., authenticated user) through the user authentication.

Also, if the user authenticating unit 45*a* does not identify a user through the user authentication, the user is treated as "a general user."

2-2. Storage Condition Configuration Unit and Display Condition Configuration Unit Referring to FIG. 2, the storage condition configuring unit 45*b* configures a storage condition based on the above-mentioned first information and/or the above-mentioned second information. The display condition configuration unit 45*c* configures a display condition based on the above-mentioned first information and/or the above-mentioned second information.

Specifically, when the first information (i.e., a configuration item included in a function that limitation is imposed) is inputted through the operation panel 5, the storage condition configuration unit 45*b* updates the storage condition table (FIG. 4) based on the first information, and the display condition configuration unit 45*c* updates the display condition table (FIG. 5) based on the first information. For example, as illustrated in FIG. 8, if the #002 user inputs a configuration item "source name" included in a transmission function with a storage option "non-storage" as the first information through the screen P2 displayed on the touch panel 5*a* of the operation panel 5, the storage condition configuration unit 45*b* moves the configuration item "source name" preliminarily included in "the storage permission range" to "the storage prohibition range" in the #002 user's record included in the storage condition table (FIG. 4).

Also, if a user inputs the second information through the operation panel 5 for limiting the range of a single or plurality of configuration items allowed to be configured by a user, the storage condition configuration unit 45*b* updates the storage condition table (FIG. 4) based on the second information, and the display condition configuration unit 45*c* updates the display condition table (FIG. 5) based on the second information. For example, if an administrator inputs the second information through the operation panel 5 for configuring all users to be the limitation target with respect to the configuration item "source name" included in the transmission function, the display condition configuration unit 45*c* configures "the source name" to be included in all records of the display condition table (FIG. 5), and the storage condition configuration unit 45*b* configures "the source name" to be included in all records of the storage condition table (FIG. 4). Accordingly, in the display condition table (FIG. 5), all records include the configuration item "the source name" in either "the display permission range" or "the display prohibition range." Also, in the storage condition table (FIG. 4), all records include "the source name" in either "the storage permission range" or "the storage prohibition range." In other words, in the present embodiment, all the configuration items in each record of the display condition table and the storage condition table correspond to the range allowed to be configured by a user of each record. For example, as illustrated in FIG. 4, a record of a #001 user includes configuration items "all copy functions" and "the source name" in "the storage permission range," and includes configuration items "destination name" and "transmission address" in "the storage prohibition range." On the other hand, as illustrated in FIG. 5, a record of the #001 user includes the configuration item "all copy functions" in "the display permission range," and includes configuration items "source name," "destination name," and "transmission address" in "the display prohibition range." Therefore, the range allowed to be configured by the #001 user corresponds to the configuration items "all copy functions," "source name," "destination name," and "transmission address."

Here, when "the storage permission range" in the storage condition table (FIG. 4) and "the display permission range" in the display condition table (FIG. 5) are configured by the same user, they may be completely the same, as illustrated in records of a #004 user, a #005 user, and a general user. Contrary to this, they may be different from each other as illustrated in records of the #001 to #003 users. Similarly, if "the storage prohibition range" in the storage condition table (FIG. 4) and "the display prohibition range" in the display condition table (FIG. 5) are configured by the same user, they may be completely the same, or may be different from each other.

2-3. Storage Operation Control Unit and Display Operation Control Unit

Referring to FIG. 2, the storage operation control unit 45*d* controls an operation of storing the history information in the first storage unit 44*a*. The display operation control unit 45*e* controls an operation of displaying the history information on the touch panel 5*a*.

Especially, in the present embodiment, the storage operation control unit 45*d* controls an operation of storing the history information in the first storage unit 44*a* based on a storage condition (specifically, the storage condition table in FIG. 4) configured by the storage condition configuring unit 45*b*. For example, if the #001 user inputs a name of destination that data are transmitted and transmission address through the operation panel 5, the storage operation control unit 45*d* prevents "the destination name" and "the transmission address" inputted by the #001 user from being added to the history information list as the history information. This is because "the storage prohibition range" in the #001 user's record included in the storage condition table (FIG. 4) includes the configuration items "destination name" and "transmission address." On the other hand, "the storage permission range" in the #001 user's records included in the storage condition table (FIG. 4) includes "the source name." Therefore, if the #001 user inputs "the source name" through the operation panel 5, the storage operation control unit 45*d* writes the inputted "source name" into the history information list as the history information. Here, when the history information is written, the storage operation control unit 45*d* writes the following in the history information list (FIG. 3) as a single record: the history information; and the date and time when a single or plurality of functions to be stored as the history information is configured.

Figure 7:
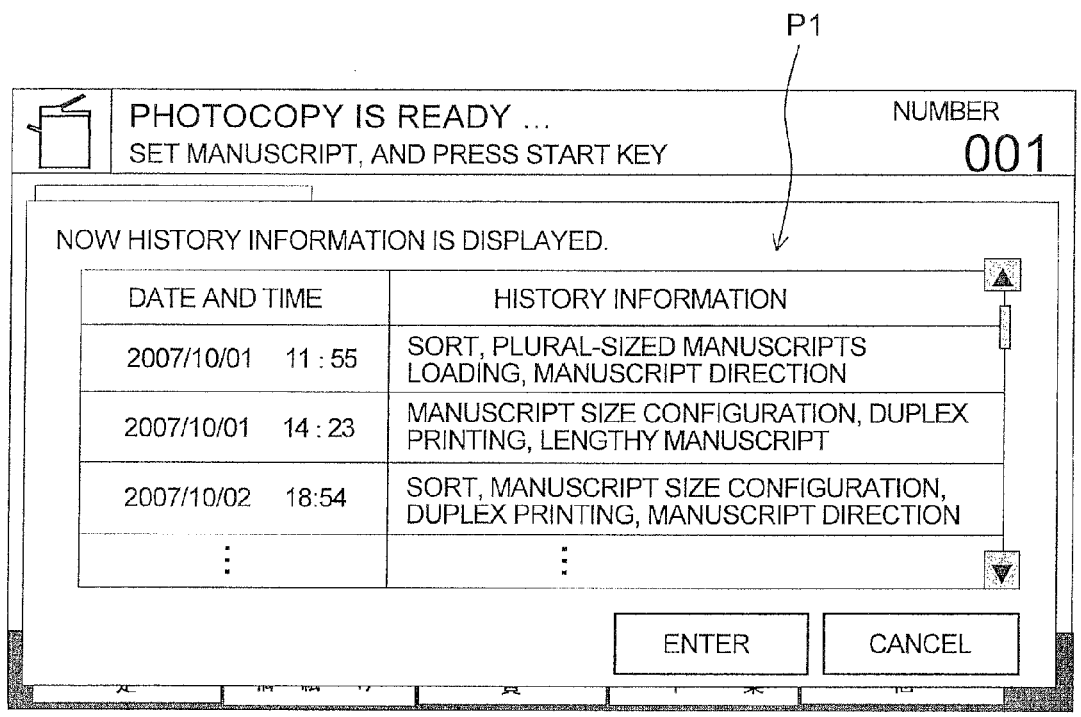
FIG. 7 is a view of an example of a history information screen displayed on a touch panel of the operation panel.

The display operation control unit 45*e* controls an operation of displaying the history information on the touch panel 5*a* based on the display condition (specifically, the display condition table in FIG. 5) configured by the display condition configuration unit 45*c*. For example, if the #001 user inputs an instruction of displaying the history information through the operation panel 5, the display operation control unit 45*e* extracts all history information regarding a copy function from the history information list stored in the first storage unit 44*a*, and controls the touch panel 5*a* to display the information (FIG. 7). This is because "the display permission range" in the #001 user's record included in the display condition table (FIG. 5) includes the configuration item "all copy functions."

Also, if a user inputs an instruction of inputting the first information and the second information through the operation panel 5 for updating a storage condition and/or a display condition, the display operation control unit 45*e* generates screen information for the user authentication, and then outputs it to the touch panel 5*a*. Next, the display operation control unit 45*e* generates screen information of the input screen of the first and second information based on the result of the user authentication by the user authentication unit 45a, and outputs it to the touch panel 5a. Accordingly, the screen P2 (FIG. 8) or the screen P3 (FIG. 9) is displayed on the touch panel 5a.

2-4. Erasing Unit

Referring again to FIG. 2, if given history information is judged not to be displayed on the touch panel 5a, the erasing unit 45f is configured to erase the history information from the first storage unit 44a. For example, if the operation panel 5 receives a user's input of the first information and/or the second information, a storage condition (i.e., the first condition) is accordingly configured. Furthermore, if there is a configuration item included in "the storage prohibition range" in all the records of the storage condition table (FIG. 4), the configuration item will not be stored. Accordingly, the erasing unit 45f judges that the configuration item does not need to be displayed, and erases the history information including the configuration item from the first storage unit 44a. Also, if all the records in the display condition table (FIG. 5) include a configuration item in their "display prohibition range," the erasing unit 45f may similarly erase the history information including the configuration item from the first storage unit 44a.

As described above, if given history information is judged not to be displayed on the touch panel 5a, the erasing unit 45f erases the history information from the first storage unit 44a. Therefore, the amount of the history information to be stored in the first storage unit 44a will be reduced. In addition, a malevolent person will be prevented from illegally reading out and referring to the history information stored in the fist storage unit 44a. In other words, so-called hacking activities will be blocked.

Also, if judging that a given configuration item is not stored and displayed, the erasing unit 45f may erase a record having the history information including the configuration item from the history information list (FIG. 3), or may erase only the corresponding configuration item from the history information.

Figure 10:
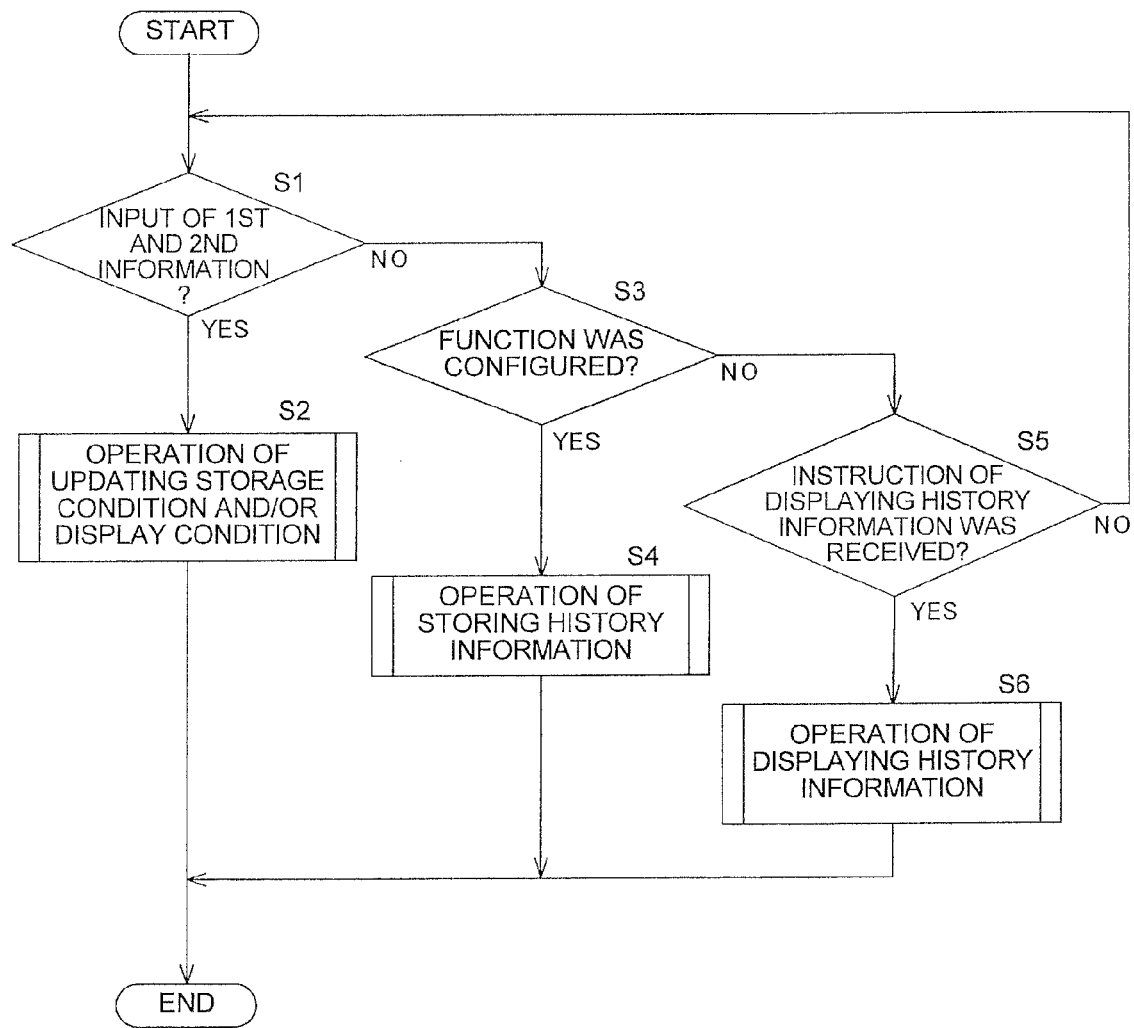
FIG. 10 is a view of a flowchart of the entire operations performed by the history information management device of the present embodiment.

3. Operation of History Information Management Device 3-1. Entire Operational Flow of History Information Management Device FIG. 10 is a view of a flowchart of the entire operation performed by the history information management device 100. Here, the first storage unit 44a in the image forming apparatus 1 has already stored a history information list including a plurality of the history information. In addition, the second storage unit 44b has already stored a storage condition table and a display condition table.

3-1-1. Steps S1 and S2

Referring to FIGS. 2 and 10, if a user inputs the first and second information through the operation panel 5 (Yes in Step S1), the control unit 45 performs an operation of updating a storage condition (i.e., the first condition) or a display condition (i.e., the second condition) (Step S2). The operational flow of updating the storage condition and/or the display condition will be explained in detail in the section "3-2. Updating Operation of Storage Condition and/or Display Condition."

3-1-2. Steps S3 and S4

If at least one of the plurality of functions of the image forming apparatus 1 is configured through the operation panel 5 (Yes in Step S3), the control unit 45 outputs an instruction for starting an image forming operation to the image forming unit 43 in the image forming apparatus 1, and performs an operation of storing the history information (Step S4). The operational flow of storing the history information will be explained in detail in the section "3-3. Operation of Storing History Information."

3-1-3. Steps S5 and S6

If a user inputs an instruction for displaying the history information through the operation panel 5 (Yes in Step S5), the control unit 45 performs an operation of displaying the history information (Step S6). The operational flow of displaying the history information will be explained in detail in the section "3-4. Operation of Displaying History Information,"

3-2. Updating Operation of Storage Condition and/or Display Condition

Figure 11:
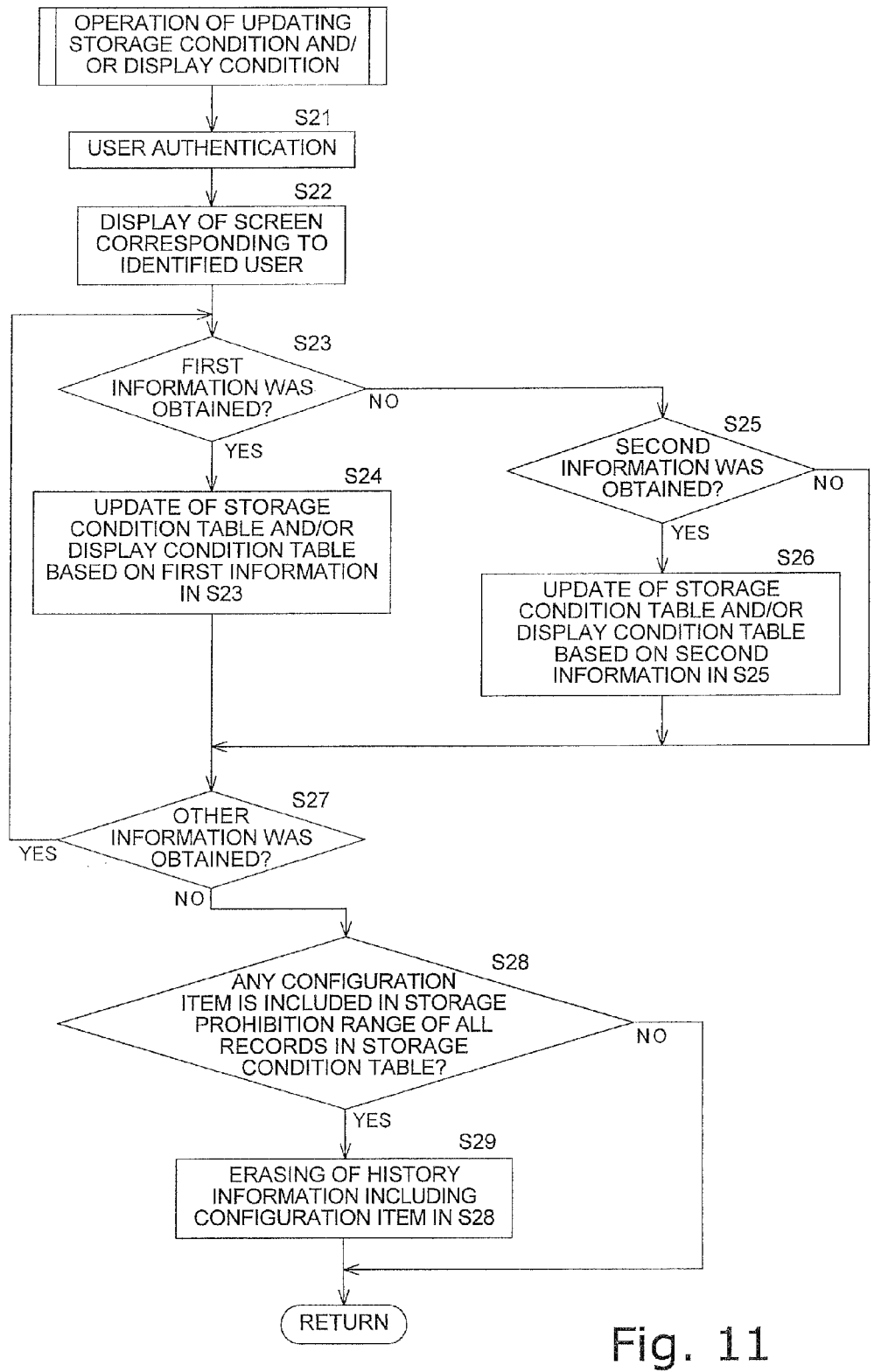
FIG. 11 is a view of a flowchart of an operation of updating a storage condition and/or a display condition performed by the history information management device of the present embodiment.

FIG. 11 is a view of a flowchart for explaining an operational flow of updating the storage condition and/or the display condition performed by the history information management device 100.

3-2-1. Steps S21 and S22

Referring to FIGS. 2 and 11, the display operation control unit 45e generates screen information for authenticating a user currently operating the image forming apparatus 1, and outputs it to the touch panel 5a. When the information for authenticating a user is inputted, the user authentication unit 45a performs the user authentication (Step S21). Then, the display operation control unit 45e displays a screen on the touch panel 5a depending on a user identified in the user authentication (Step S22). For example, if a user is identified as an administrator as the result of the user authentication, the screen P3 (FIG. 9) will be displayed on the touch panel 5a. On the other hand, if a user is identified as an authenticated user as the result of the user authentication, the screen P2 (FIG. 8) will be displayed on the touch panel 5a. In the present embodiment, if a user is not identified as the result of the user authentication in Step S21, the user will be treated as a general user. Here, the general user cannot input the first and second information in consideration of information security protection.

3-2-2. Steps S23 and S24

If the first information (i.e., a single or plurality of configuration items included in a function to be limited) is inputted through the screen P2 (FIG. 8) or the screen P3 (FIG. 9) displayed on the touch panel 5a (Step S23), the storage condition configuration unit 45b updates the storage condition table (FIG. 4) based on the first information, and/or the display condition configuration unit 45c updates the display condition table (FIG. 5) based on the first information (Step S24)

3-2-3. Steps S25 and S26

If the second information is inputted through the screen P2 (FIG. 8) or the screen P3 (FIG. 9) displayed on the touch panel 5a for limiting a range of a single or plurality of the configuration items allowed to be configured by a user (Step S25), the storage condition configuration unit 45b updates the storage condition table (FIG. 4) based on the second information, and/or the display condition configuration unit 45c updates the display condition table (FIG. 5) based on the second information (Step S26).

3-2-4. Step S27

If the first information and/or the second information are/is inputted by a user and are/is received by the operation panel 5 (Yes in Step S27), the history information management device 100 repeatedly performs a series of steps starting from Step S23.

3-2-5. Step S28

If the input of the first information and/or the second information has been completed in Step S27 (No in Step S27), the erasing unit 45f judges whether or not there is a configuration item included in "the storage prohibition range" in all the records in the storage condition table of FIG. 4 (Step S28).

3-2-6. Step S29

If there is a configuration item included in "the storage prohibition range" in all the records in the storage condition table of FIG. 4 (Yes in Step S28), the erasing unit 45*f* extracts the history information including the configuration item from the history information list stored in the first storage unit 44*a*, and erases it (Step S29).

3-3. Operation of Storing History Information

Figure 12:
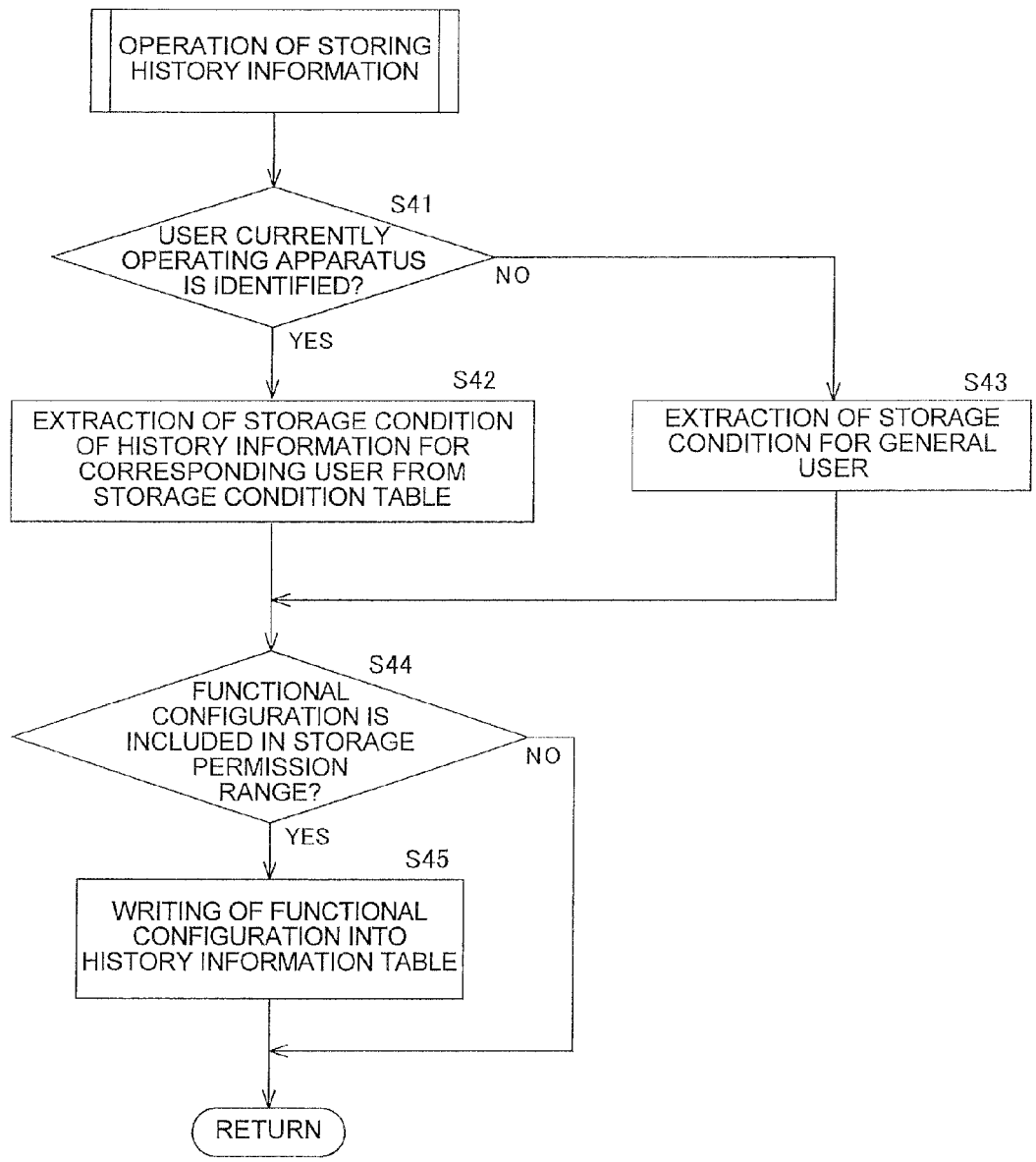
FIG. 12 is a view of a flowchart of an operation of storing the history information performed by the history information management device of the present embodiment.

FIG. 12 is a view of a flowchart for explaining an operation flow of storing the history information performed by the history information management device 100.

3-3-1. Steps S41 to S43

Referring to FIGS. 2 and 12, if a user currently operating the image forming apparatus 1 (i.e., the user who have configured a function in Step S3) has been identified in the user authentication or the like (Yes in Step S41), the storage operation control unit 45*d* extracts a storage condition of the history information uniquely configured for the user from the storage condition table (FIG. 4) stored in the second storage unit 44*b* (Step S42). On the other hand, if a user currently operating the image forming apparatus 1 has not been identified (No in Step S41), the storage operation control unit 45*d* extracts the storage condition of the history information for a general user from the storage condition table (Step S43).

3-3-2. Steps S44 and S45

The storage operation control unit 45*d* judges whether or not each of the configuration items included in a function configured in Step S3 is included in "the storage permission range" in the storage condition extracted in Step S42 or Step S43 (Step S44). If all the configured configuration items are included in "the storage permission range" of the extracted storage condition, the storage operation control unit 45*d* stores the functional configuration performed in Step S3 in the history information list as the history information (Step S45). If all the configured configuration items are not included in "the storage permission range" of the extracted storage condition, the functional configuration is not stored in the history information list.

3-4. Operation of Displaying History Information

Figure 13:
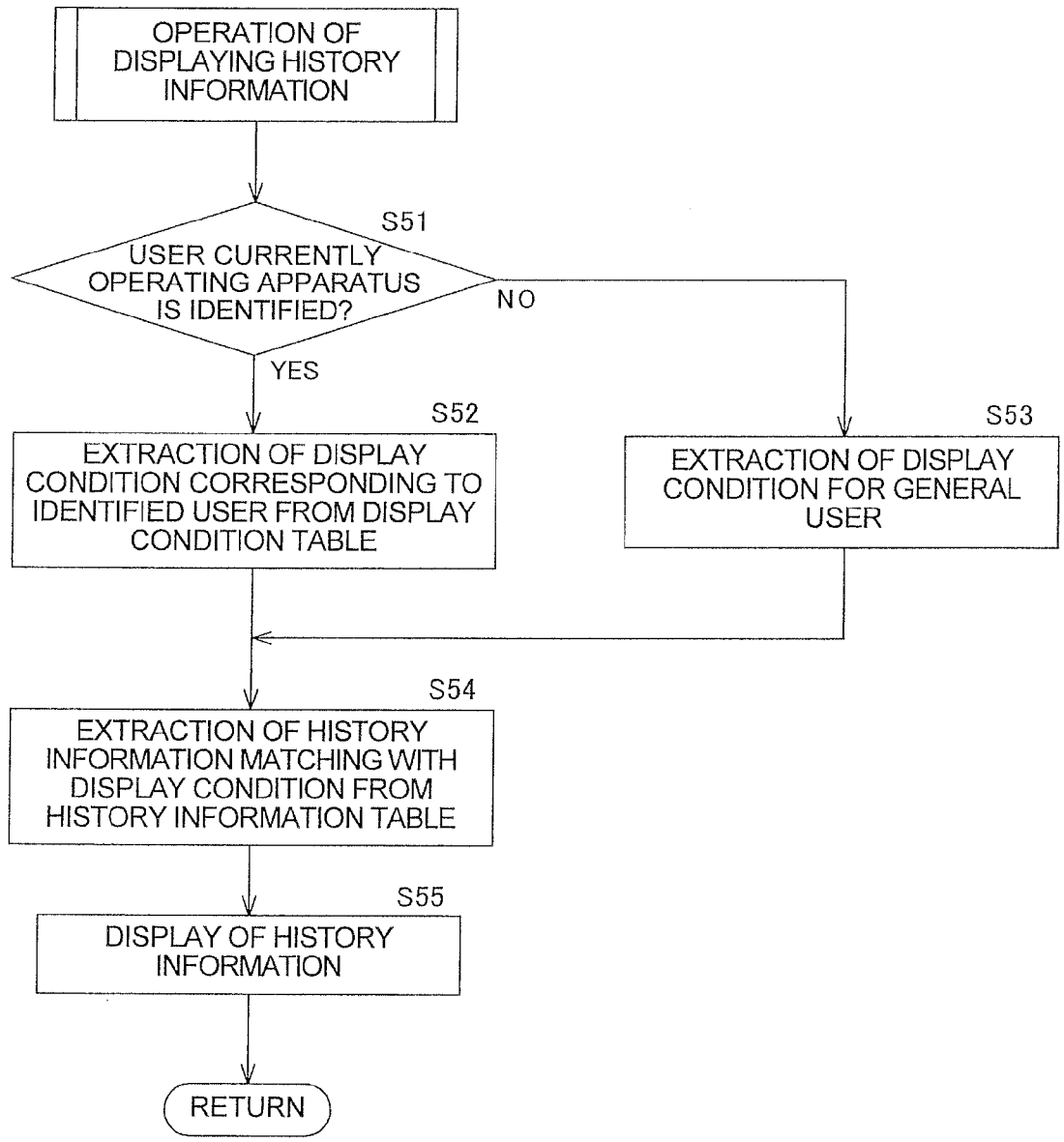
FIG. 13 is a view of a flowchart of an operation of displaying the history information performed by the history information management device of the present embodiment.

FIG. 13 is a view of a flowchart for explaining an operational flow of displaying the history information performed by the history information management device 100.

3-4-1. Steps S51 to S53

Referring to FIGS. 2 and 13, the display operation control unit 45*e* generates screen information for authenticating a user currently operating the image forming apparatus 1, and outputs it to the touch panel 5*a*. If the information is inputted for the user authentication, the user authentication unit 45*a* performs the user authentication (Step S51). If a user currently operating the image forming apparatus 1 is identified as the result of the user authentication (Yes in Step S51), the display operation control unit 45*e* extracts a display condition corresponding to the identified user from the display condition table (FIG. 5) stored in the second storage unit 44*b* (Step S52). On the other hand, if the user currently using the image forming apparatus 1 is not identified as the result of the user authentication (No in Step S51), the display operation control unit 45*e* extracts a display condition of the history information for a general user from the display condition table (Step S53).

3-4-2. Steps S54 and S55

The display operation control unit 45*e* extracts the history information matching with the display condition extracted in Step S52 or S53 from the history information list (FIG. 3) stored in the first storage unit 44*a* (Step S54). As exemplified in FIG. 7, the display operation control unit 45*e* then displays the extracted history information on the touch panel 5*a* (Step S55). If the history information matching with the display condition extracted in Step S52 or S53 does not exist in the history information list, the display operation control unit 45*e* controls the touch panel 5*a* to display a screen indicating that there is no history information.

4. Working Effects (a) According to the history information management device 100 of the present embodiment, the storage operation control unit 45*d* controls an operation of storing the history information performed by the first storage unit 44*a* based on the storage condition for judging whether or not the storage operation control unit 45*d* controls the first storage unit 44*a* to store the history information. The display operation control unit 45*e* controls an operation of displaying the history information performed by the touch panel 5*a* based on the display condition for judging whether or not the display operation control unit 45*e* controls the touch panel 5*a* to display the history information. In other words, if given history information is judged to be stored based on the storage condition, it is stored in the first storage unit 44*a*. In addition, if given history information is judged to be displayed based on the display condition, it is displayed on the touch panel 5*a*. Accordingly, unnecessarily excessive history information is not displayed on the touch panel 5*a*. Thus, user-friendliness of the device will be enhanced. Also, depending on a configuration of the storage condition, the personal information (e.g., destination of data transmission) is not stored in the first storage unit 44*a* as the history information. In addition, depending on a configuration of the display condition, the personal information (e.g., destination of data transmission) is not displayed on the touch panel 5*a* as the history information. Therefore, the information security will be enhanced.

(b) The operation panel 5 is configured to obtain the first information regarding a function to be limited to be stored in the first storage 44*a* and/or displayed on the touch panel 5*a*. The first information corresponds to a single or plurality of configuration items included in a function on which a user wants to impose a limitation for storage and/or display. Therefore, the history information management device 100 is configured to obtain the configuration item(s) (i.e., the first information) on which a user wants to impose the limitation, for example, directly from a user. Then, the history information management device 100 is configured to determine the storage condition and the display condition based on the obtained configuration item(s). Thus, a user is capable of directly imposing limitations for storage and/or display on the desired configuration item(s). Therefore, usability of the device will be enhanced.

(c) The operation panel 5 is configured to obtain the second information for limiting the range of the first information to be obtained by the operation panel 5. The second information relates to information for limiting a single or plurality of configuration items allowed to be configured by a user through the operation panel 5. In other words, the second information corresponds to "the user-specific limitation range for a single or plurality of configuration items." Therefore, the history information management device 100 is configured to obtain the user-specific limitation range for a single or plurality of configuration items. Furthermore, the storage condition and the display condition are allowed to be determined based on the limitation range of the configuration item(s). As a result, a user is capable of imposing limitations for storage and/or display on a single or plurality of configuration items included in the limitation range.

(d) According to the history information management device 100, the operation panel 5 is configured to obtain a plurality of configuration items (i.e., the first information) that a user wants to impose limitation of storage and/or display and a plurality of the user-specific limitation ranges for a single or plurality of configuration items (i.e., the second information) in a single operation performed by a user. Thus, if a user wants to impose a limitation for storage and/or display on all the configuration items included in a function, the user is capable of imposing the limitation on all configuration items in a single operation without selecting and imposing the limitation on the configuration items one by one. Therefore, usability of the device will be further enhanced.

(e) If given history information is judged not to be displayed on the touch panel 5*a*, the erasing unit 45*f* in the history information management device 100 is configured to erase the history information from the history information list stored in the first storage unit 44*a*. Accordingly, the amount of history information to be stored in the first storage unit 44*a* will be reduced. Furthermore, a malevolent third party will be prevented from illegally reading out and referring the history information stored in the first storage unit 44*a*. In other words, so-called hacking activities will be blocked. Thus, information security of the device will be enhanced.

(f) As illustrated in the storage condition table (FIG. 4) and the display condition table (FIG. 5), according to the history information management device 100, the storage condition (i.e., the first condition) and the display condition (i.e., the second condition) are uniquely configured on a user-to-user basis, respectively. Therefore, the history information will be stored in the first storage unit 44*a* and displayed on the touch panel 5*a* on a condition uniquely configured for each user.

OTHER EXAMPLE EMBODIMENTS (A) In the above-mentioned embodiment, the condition configuration screen P2 for the first information (FIG. 8) and the condition configuration screen P3 for the second information (FIG. 9) are configured to be displayed on the touch panel 5*a*. However, the screens may not be displayed on the touch panel 5*a*, and may be displayed on a display unit installed in an external apparatus connected to the image forming apparatus 1 through the communication unit 41 for their communication. In this case, an administrator and authenticated users of the image forming apparatus 1 are capable of inputting the first and second information through the display unit and an operation unit installed in the external apparatus.

(B) The range of a single or plurality of configuration items configured by a user (i.e., the limitation range) may be uniquely configured for each user with specific authentications (e.g., an administrator, a power user, and general user of the image forming apparatus 1).

Accordingly, a malignant general user will be prevented from changing "the configuration permission range." Thus, higher information security will be ensured.

(C) In the above-mentioned embodiment, both the storage condition to judge whether or not the history information is stored in the first storage unit 44*a* and the display condition for judging whether or not the history information is displayed on the touch panel 5*a* are stored in the second storage unit 44*b*. However, in the present invention, either of the storage condition and the display condition may be stored in the second storage unit 44*b*, as long as display of the history information on the touch panel 5*a* is limited.

(D) In the above-mentioned embodiment, the history information management device 100 includes the first storage unit 44*a* for storing the history information and the second storage unit 44*b* for storing the storage condition and the display condition. However, the history information management device 100 may include only one storage unit, and all of the history information, the storage condition, and the display condition may be stored in the storage unit.

(E) In the above-mentioned embodiment, the configuration items of the functions are classified into "the storage-permission range" and "the storage prohibition range" in the storage condition table (FIG. 4). Also, the configuration items of the functions are classified into "the display permission range" and "the display prohibition range" in the display condition table (FIG. 5). However, either of "the storage permission range" and "the storage prohibition range" may be included in the storage condition table. Similarly, either of "the display permission range" and "the display prohibition range" may be included in the display condition table.

(F) As illustrated in FIGS. 4 and 5, in the above-mentioned embodiment, the personal information (mainly destination name and destination address) is prevented from being stored in the first storage unit 44*a* or being displayed on the touch panel 5*a* as the history information. Thus, higher information security will be ensured by actively imposing a limitation (e.g., prohibition of storage and/or display) on a single or plurality of configuration items highly considered to be personal information.

(G) If a single or plurality of configuration items is classified as personal information and should not be stored and/or displayed as the history information in consideration of the information security, the configuration items of this type may be preliminarily configured to be included in "the storage prohibition range" and/or "the display prohibition range" when the image forming apparatus 1 including the history information management device 100 of the present invention is shipped. Accordingly, even if the image forming apparatus 1 is used by a user unfamiliar to its operation, the user will be prevented from unexpectedly storing and/or displaying the history information (e.g., personal information). In other words, higher information security will be ensured from the start of using the image forming apparatus 1.

INDUSTRIAL APPLICABILITY

According to the history information management device of the present invention, operations of storing and displaying the history information are appropriately performed. Accordingly, unnecessarily excessive history information is not displayed on the display unit. Thus, the history information management device achieves a working effect of enhancing its user-friendliness. Also, according to the history information management device of the present invention, the personal information or the like is not displayed on the display unit as the history information, depending on a configuration of the first and second conditions. Therefore, the history information management device achieves a working effect of enhancing its information security. Based on the above, the history information management device of the present invention is allowed to be applied to the image forming apparatus such as a MFP with a variety of functions as a photocopier, a printer, a facsimile machine, and a scanner.

GENERAL INTERPRETATION

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A history information management device of an image forming apparatus having a plurality of functions, comprising:
   a configuration receiving unit being configured to receive a configuration for at least one of the plurality of functions;
   a storage unit being configured to store the configuration received by the configuration receiving unit as history information;
   a display unit being configured to display the history information; and
   an operation control unit being configured to control an operation of storing the history information performed by the storage unit based on a first condition judging whether or not the operation control unit controls the storage unit to store the history information and/or an operation of displaying the history information performed by the display unit based on a second condition judging whether or not the operation control unit controls the display unit to display the history information.

2. The history information management device of an image forming apparatus according to claim 1, further comprising
   a first information obtaining unit configured to obtain first information regarding the function to be limited to be stored in the storage unit and/or displayed on the display unit, wherein
   the first and second conditions are determined based on the first information.

3. The history information management device of an image forming apparatus according to claim 2, further comprising
   a second information obtaining unit configured to obtain second information limiting a range of the first information to be obtained by the first information obtaining unit, wherein
   the first and second conditions are further determined based on the second information.

4. The history information management device of an image forming apparatus according to claim 3, wherein
   the first and second information obtaining units are configured to obtain a plurality of the first information and a plurality of the second information in a single operation performed by a user, respectively.

5. The history information management device of an image forming apparatus according to claim 1, further comprising
   an erasing unit configured to erase the history information from the storage unit when the history information is judged not to be displayed on the display unit.

6. The history information management device of an image forming apparatus according to claim 1, wherein
   the first and second conditions are uniquely configured on a user-to-user basis, respectively.

* * * * *